(12) United States Patent
Ukai et al.

(10) Patent No.: US 7,648,186 B2
(45) Date of Patent: *Jan. 19, 2010

(54) LOCKING MECHANISM FOR A ROTATION SEAT

(75) Inventors: Yosuke Ukai, Kariya (JP); Kazushi Kamiya, Kariya (JP)

(73) Assignee: Kabushiki Kaisha Toyota Jidoshokki, Aichi-ken (JP)

( * ) Notice: Subject to any disclaimer, the term of this patent is extended or adjusted under 35 U.S.C. 154(b) by 229 days.

This patent is subject to a terminal disclaimer.

(21) Appl. No.: 11/890,883

(22) Filed: Aug. 7, 2007

(65) Prior Publication Data

US 2008/0041129 A1 Feb. 21, 2008

(30) Foreign Application Priority Data

Aug. 11, 2006 (JP) ............................ P2006-219247

(51) Int. Cl.
*B60N 2/14* (2006.01)
(52) U.S. Cl. ................................ 296/65.06; 297/344.22
(58) Field of Classification Search .............. 296/65.06, 296/65.07; 248/415, 418; 297/344.21, 344.22, 297/344.23
See application file for complete search history.

(56) References Cited

U.S. PATENT DOCUMENTS 7,434,863 B2 * 10/2008 Hamazaki et al. ........ 296/65.07

FOREIGN PATENT DOCUMENTS

| JP | 05-018961 | 3/1993 |
| JP | 08-324314 | 12/1996 |

* cited by examiner

*Primary Examiner*—Joseph D Pape
(74) *Attorney, Agent, or Firm*—Locke Lord Bissell & Liddell, LLP

(57) ABSTRACT

A locking mechanism for a rotation seat includes a plate member fixed to an underside of the rotation seat, a stopper member attached to the plate member, a base member fixed to a base, a rotary shaft which supports the plate member rotatably with respect to the base member, a locking recess formed in an intermediate portion of the guide slot, and a resilient member provided in the plate member for urging the stopper member in a direction in which the stopper member is locked to the locking recess. The base member is formed with a guide slot. The locking recess is formed continuously from the guide slot so that the width thereof becomes narrower with distance from the guide slot. When the stopper member moves in a guide direction along the guide slot and gets into the locking recess, the stopper member is urged in the direction.

8 Claims, 10 Drawing Sheets

FIG. 1

(FRONT)

FIG. 2A (FRONT)

IN NORMAL OPERATION

FIG. 2B

IN BACKWARD MOVEMENT

FIG. 2C

IN GETTING OFF A VEHICLE

LOCKING MECHANISM FOR A ROTATION SEAT

BACKGROUND OF THE INVENTION

The present invention relates to a locking mechanism for a rotation seat such as a driver seat.

As a rotating mechanism for a seat such as a driver seat there generally is known, for example, such a rotating mechanism as is disclosed in Japanese Utility Model Application Publication No. 5-18961. This type of seat rotating mechanism has a member fixed to an underside of the seat and a member (base member) fixed to a seat installed place (base). The member fixed to the underside of the seat is supported so as to be rotatable with respect to the base member. By such a configuration there is obtained a rotation seat which is rotatable with respect to the base.

In case of installing and using such a rotation seat in an industrial vehicle for example, the rotation seat, in an ordinary mode of use, is turned to the front side and fixed so that an operator sifting thereon can perform operations. For example, in backward movement of the vehicle, the rotation seat is rotated in a predetermined direction different from the front side and is fixed. Therefore, it is necessary to provide a locking mechanism for switching between an unlocked state in which the rotation seat can rotate and a locked state in which the rotation seat cannot rotate.

As a configuration of such a locking mechanism there is conceivable a configuration wherein a guide slot and a locking recess continuous from an intermediate portion of the guide slot are formed in a base member, and a stopper member guided by the guide slot and lockable to the locking recess is attached to a member secured to an underside of a seat, the stopper member being urged by a resilient member such as a coil spring in a direction (locking direction) in which it is locked to the locking recess. The locking recess has a tapered shape such that the width thereof becomes narrower with distance from the guide slot. Correspondingly to the width of the locking recess, the width of the stopper member also becomes narrower toward a front end thereof located on the locking recess side. The stopper member is supported by being fitted in a supporting slot formed in the member secured to the underside of the seat. Correspondingly to the stopper member, the width of the supporting slot also becomes narrower toward a front end thereof located on the locking recess side. In this locking mechanism, for unlocking the rotation seat, a lever connected to the stopper member is operated to move the stopper member in a direction (toward the guide slot) opposite to the above locking direction, while for locking the rotation seat, the operation of the lever is slackened, thereby causing the stopper member which has undergone an urging force from the resilient member to move in the locking direction into engagement in the locking recess.

In the above locking mechanism, when rotating the rotation seat in a different direction and locking it in this state, the stopper member operates in the following manner. First, the stopper member moves while being guided along the guide slot, thereafter, when the stopper member arrives at the position of the locking recess lying in an intermediate portion of the guide slot, the stopper member moves in the locking direction and is locked to the locking recess under the urging force of the resilient member, whereby the rotation seat is locked. Since the locking recess and the stopper member are tapered as described above, the stopper member is easy to enter the locking recess during movement of the stopper member along the guide slot.

In such a locking mechanism, when the rotating operation of the rotation seat is performed at low speed, the stopper member gets into the locking recess and is locked positively by the locking recess. However, when the rotating operation of the rotation seat is performed at high speed, even if the stopper member gets into the locking recess, there still remains a strong force in the moving direction (guiding direction) along the guide slot due to an inertia force of the rotation seat. At this time, since the stopper member and the locking recess are of such a shape as described above, the stopper member undergoes a force acting in a direction (toward the guide slot) leaving the locking recess opposite to the locking direction at both contact portions thereof with the locking recess and with the supporting slot. When this force exceeds the urging force of the resilient member, the stopper member returns to the guide slot without being locked by the locking recess. As a result, the stopper member passes the locking recess without being locked to the locking recess, thus giving rise to the problem that the rotation seat cannot be locked at the predetermined position.

The present invention is directed to a locking mechanism for a rotation seat wherein a stopper member is locked positively to a locking recess even when the rotation seat is rotated at relatively high speed.

SUMMARY OF THE INVENTION

An aspect of the present invention provides a locking mechanism for a rotation seat for use in an industrial vehicle. The locking mechanism includes a plate member fixed to an underside of the rotation seat, a stopper member attached to the plate member, a base member fixed to a base of the industrial vehicle, a rotary shaft which supports the plate member rotatably with respect to the base member, a locking recess formed in an intermediate portion of the guide slot for locking the stopper member, and a resilient member provided in the plate member for urging the stopper member in a direction in which the stopper member is locked to the locking recess. The base member is formed with a guide slot for defining a rotatable range of the plate member. The locking recess is formed continuously from the guide slot so that the width thereof becomes narrower with distance from the guide slot. When the plate member rotates with respect to the base member, the stopper member is guided along the guide slot and is locked by the locking recess, whereby the plate member becomes a locked state in which the plate member is unrotatable relative to the base member. When the stopper member moves in at least one of guide directions along the guide slot and gets into the locking recess, the stopper member is urged in the direction in which the stopper member is locked to the locking recess so that the contact portion of the stopper member and the locking recess press each other while the plate member and the stopper member are in contact with each other.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention together with objects and advantages thereof, may best be understood by reference to the following description of the presently preferred embodiments together with the accompanying drawings in which:

DETAILED DESCRIPTION OF THE PREFERRED EMBODIMENTS

A preferred embodiment of the present invention will be described hereunder with reference to the accompanying drawings.

Figure 1:
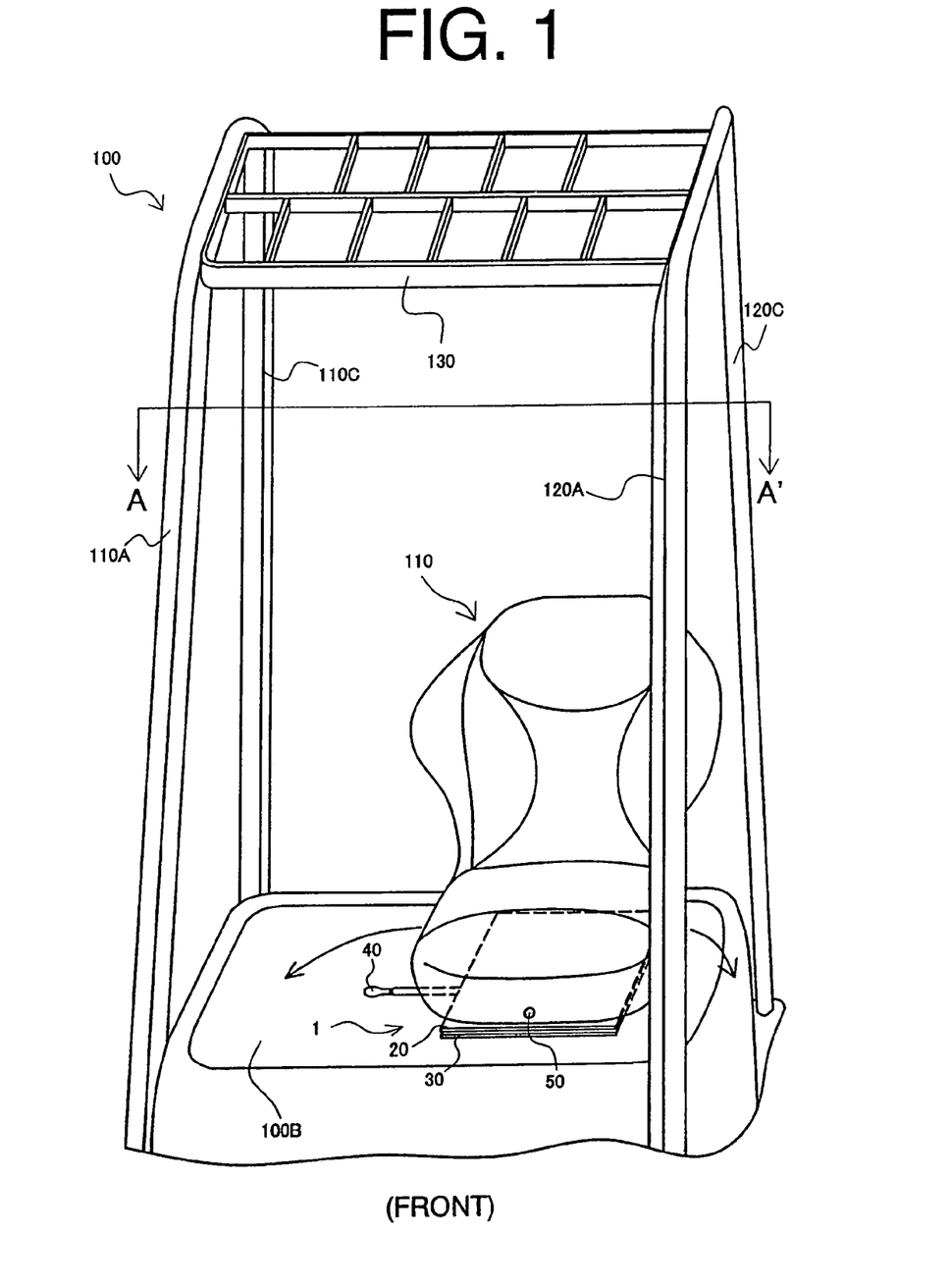
FIG. 1 is a schematic perspective view of a seat area including a locking mechanism for a rotation seat according to an embodiment of the present invention.

First, with reference to FIG. 1, a description will be given below about a rotation seat and a locking mechanism for the rotation seat according to an embodiment of the present invention. FIG. 1 is a perspective view of a seat area of an industrial vehicle (e.g., a fork lift) to which the locking mechanism for the rotation seat embodying the present invention is applied.

As shown in FIG. 1, a seat area 100 includes a rotation seat 110, a base 100B on which the rotation seat 110 is installed, pillars 110A, 110C, 120A and 120C, and a head guard 130. A locking mechanism 1 for the rotation seat 110 includes a plate member 20 fixed to an underside of the rotation seat 110, a stopper member (to be described later) attached to the plate member 20, a base member 30 fixed to the base 100B, and a rotary shaft 50 which supports the plate member 20 rotatably with respect to the base member 30. The rotation seat 110 is for a driver of the industrial vehicle to sit thereon and is rotatable with respect to the base 100B with the rotary shaft 50 as fulcrum. Operating devices necessary for operating the vehicle, as well as instruments, (neither shown), are installed in front of the rotation seat 110. Front, rear and right, left directions in the following description indicate those directions with respect to the driver sitting on the rotation seat 110.

Figure 2A:
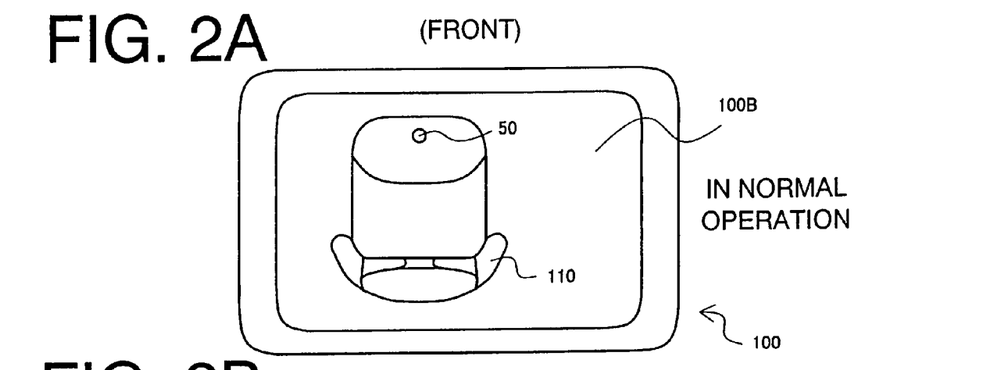
FIG. 2A is an explanatory diagram corresponding to a view taken in the direction of arrow A-A' in FIG. 1 and showing a state of the rotation seat in normal operation.
Figure 2B:
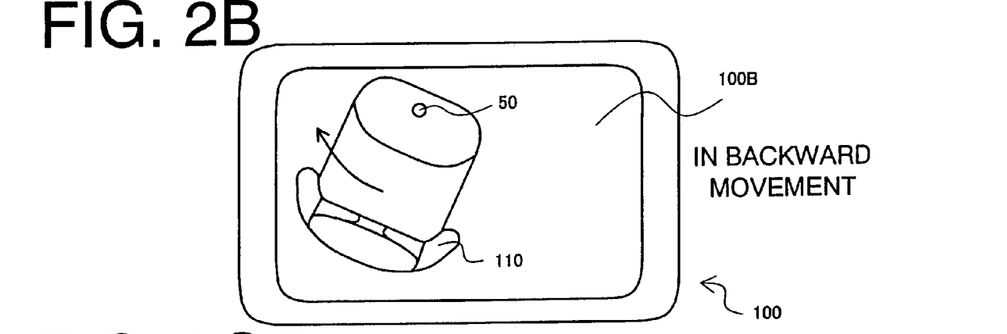
FIG. 2B is an explanatory diagram corresponding to a view taken in the direction of arrow A-A' in FIG. 1 and showing a state of the rotation seat in backward movement.
Figure 2C:
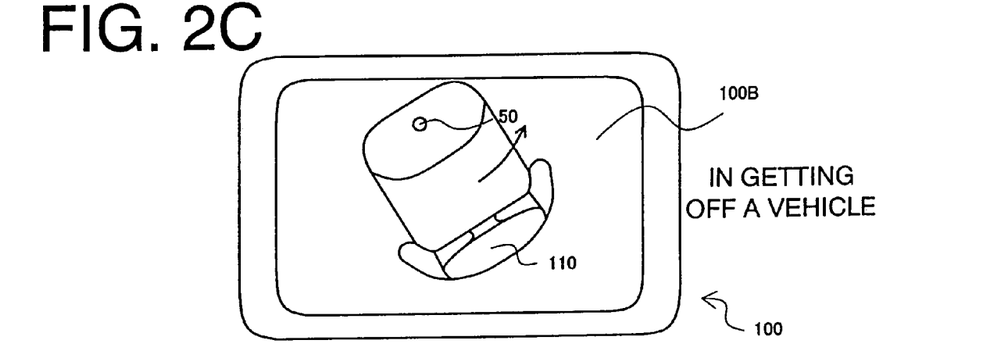
FIG. 2C is an explanatory diagram corresponding to a view taken in the direction of arrow A-A' in FIG. 1 and showing a state of the rotation seat in getting off the vehicle.

FIGS. 2A, 2B and 2C are top views corresponding to a view taken in the direction of arrow A-A' in FIG. 1 and showing rotational states of the rotation seat 110. In normal operation, as shown in FIG. 2A, the rotation seat 110 is fixed toward the front side so that the driver can perform operations. For example, when the vehicle moves backward, the rotation seat 110 is rotated to the right side with respect to the front side and is fixed there (see FIG. 2B). The reason is that due to a positional relation to the operating devices such as pedals necessary for operation such a position is convenient for the driver to operate the operating devices located in front while looking at the rear side directly. For the driver to get off the vehicle, the rotation seat 110 is rotated to the left side with respect to the front side and is fixed there (see FIG. 2C). With the locking mechanism 1, it is possible to make switching between an unlocked state permitting rotation of the rotation seat 110 and a locked state not permitting rotation of the rotation seat 110. Release of the locked state by the locking mechanism 1 is performed by operating a pivot lever 40 attached to the plate member 20. The details of the locking mechanism 1 will be described below with reference to FIGS. 3 to 8B.

Figure 3:
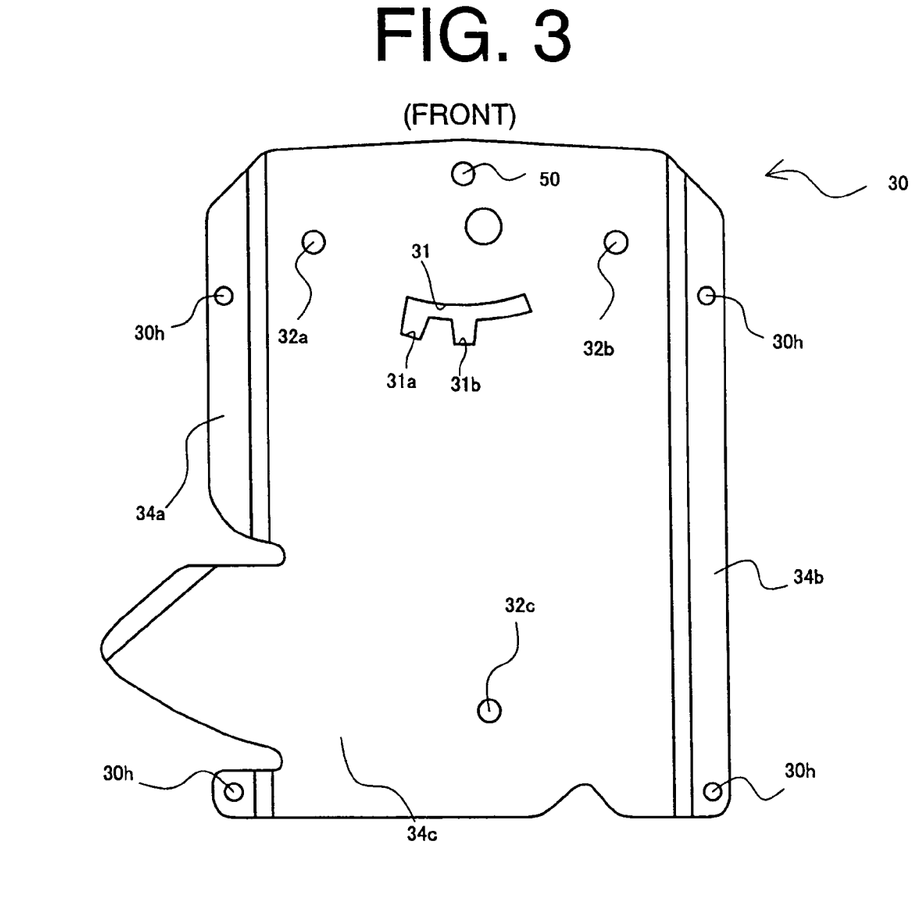
FIG. 3 is a top view of a base member shown in FIG. 1.

First, the base member 30 will be described with reference to FIG. 3. The base member 30, which is fixed to the base 100B of the vehicle as noted above, is a plate member formed by punching and bending of a metallic plate. Abutments 34a and 34b are formed on opposite sides (left and right sides in FIG. 3) of the base member 30. In the abutments 34a and 34b there are formed holes 30h which are for fixing the base member 30 to the base 100B of the vehicle with bolts. Between the abutments 34a and 34b there is formed a flat portion 34c whose height is slightly larger than the height of each of the abutments 34a and 34b. An upper surface of the flat portion 34c is a flat surface. A rotary shaft 50 which supports the plate member 20 rotatably with respect to the base member 30 is installed at a front position of the flat portion 34c perpendicularly to the flat portion 34c.

Shaft members 32a, 32b and 32c like the rotary shaft 50 are installed perpendicularly on the upper surface of the flat portion 34c. The shaft member 32a is disposed at a front position close to the abutment 34a, the shaft member 32b is disposed at a front position close to the abutment 34b, and the shaft member 32c is disposed at a rear position.

In the flat portion 34c of the base member 30 there is formed a guide slot 31 which defines a rotatable range of the plate member 20. A stopper member (to be described later) provided in the pivot lever 40 (to be described later) of the plate member 20 is inserted into the guide slot 31. The guide slot 31 is formed in an arcuate shape centered on the rotary shaft 50 in front of the rotary shaft 50 and locking recesses 31a and 31b are formed rearward in predetermined positions of the guide slot 31. The guide slot 31 defines a range of 25° to the right and 17° to the left as a rotatable range of the plate member 20.

The locking recesses 31a and 31b are each formed in a wedge shape such that the recess width becomes narrower with distance from the guide slot 31 so as to permit easy entry therein of the stopper member attached to the plate member 20. The locking recess 31b is a recess for a front position formed continuously from an intermediate position of the guide slot 31 and the stopper member is fixed to a front position in which the rotation of the plate member 20 is 0° to the right and left when the stopper member is locked by the locking recess 31b. The locking recess 31a is a recess for a left turn position and the stopper member is fixed to a left turn position in which the rotation of the plate member 20 is about 17° to the left when the stopper member is locked by the locking recess 31a.

Figure 4:
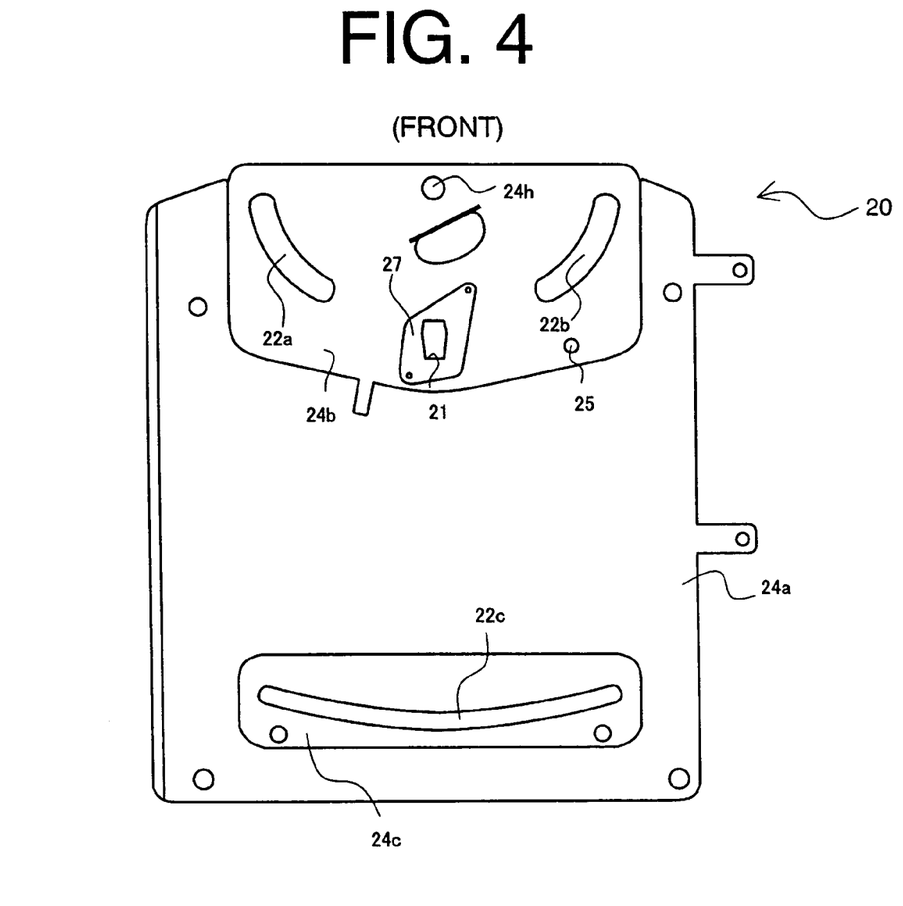
FIG. 4 is a top view of a plate member shown in FIG. 1.
Figure 5:
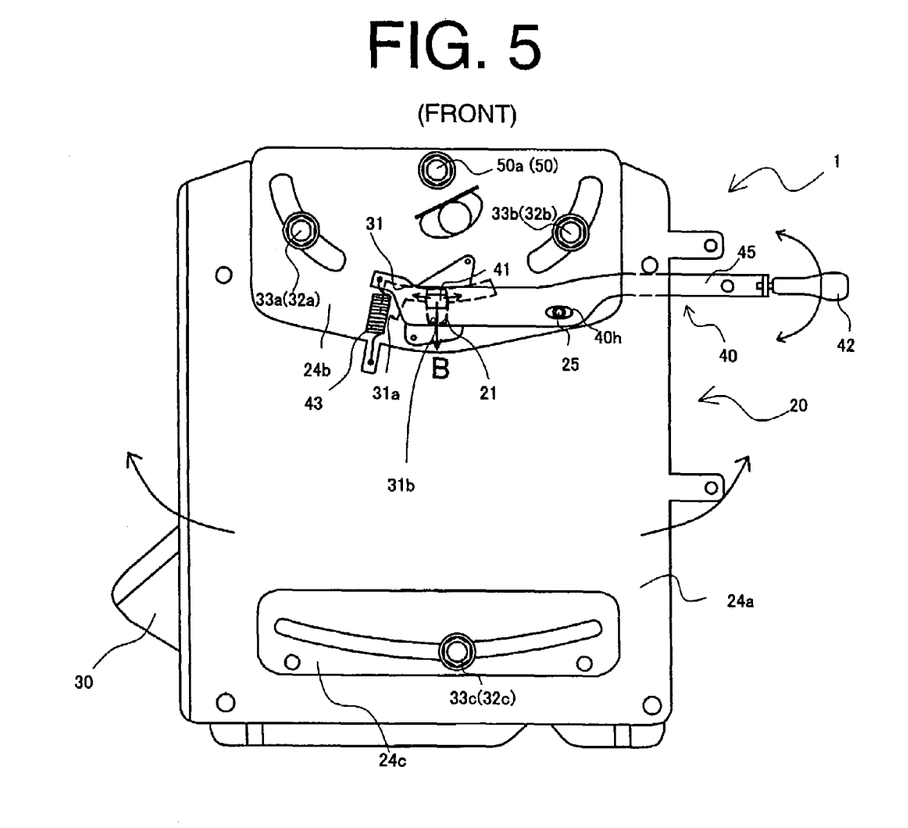
FIG. 5 is a top view of a locking mechanism for a rotation seat shown in FIG. 1.

Next, the plate member 20 will be described with reference to FIGS. 4 and 5. The plate member 20 is supported rotatably by the base member 30 through the rotary shaft 50. As shown in FIG. 4, the plate member 20 includes a pedestal 24a and surface portions 24b and 24c which are a littler lower than the pedestal 24a.

The rotation seat 110 is attached to an upper surface of the pedestal 24a and the surface portion 24b is formed at a front position of the plate member 20, while the surface portion 24c is formed at a rear position of the plate member 20. In the front surface portion (so called hereinafter) 24b there are formed a shaft hole 24h and arcuate guide slots 22a, 22b. The rotary shaft 50 and the left and right shaft members 32a, 32b of the base member 30 are inserted into the shaft hole 24h and the guide slots 22a, 22b, respectively. An arcuate guide slot 22c is formed in the rear surface portion (so called hereinafter) 24c and the rear shaft member 32c is inserted into the guide slot 22c.

The guide slots 22a to 22c in the front and rear surface portions 24b, 24c are each formed in an arcuate shape centered on the rotary shaft 50 and the length of each of the guide slots 22a to 22c is set to a length corresponding to the guide slot 31 of the base member 30 which defines the rotatable range of the plate member 20. With the plate member 20 connected to the base member 30, nuts 50a and 33a to 33c for preventing dislodgement are fitted on the rotary shaft 50 and the shaft members 32a to 32c, respectively. Likewise, with the pivot lever 40 secured to the plate member 20, a stopper supporting slot 21 for insertion therein of a stopper member 41 provided in the pivot lever 40 is formed in the front surface portion 24b (see FIG. 5). At a position spaced away from the stopper supporting slot 21 there is disposed a pivot shaft 25 which supports the pivot lever 40 pivotably with respect to the plate member 20 (see FIG. 5).

The stopper supporting slot 21, which defines a pivoting range of the pivot lever 40, is formed so as to permit movement of the stopper member 41 from the guide slot 31 to the locking recesses 31a and 31b (also from the locking recesses 31a and 31b to the guide slot 31). Consequently, movement of the stopper member 41 relative to the plate member 20 is defined in the direction ("locking direction" hereinafter) in which the stopper member 41 is locked to the locking recesses 31a and 31b and also in the direction opposite thereto. The width of the stopper supporting slot 21 is narrower toward each of the end on the side of the locking recesses 31a and 31b (i.e., on the rear side) with respect to the guide slot 31 and the end on the side (i.e., on the front side) opposite to the locking recesses 31a and 31b (see an enlarged diagram of FIGS. 7A to 7D) with respect to the guide slot 31. A reinforcing plate 27 having a hole of a shape corresponding to the stopper supporting slot 21 is mounted on an upper surface of the front surface portion 24b and around the stopper supporting slot 21, whereby the stopper supporting slot 21 is prevented from being deformed by the stopper member 41.

Next, with reference to FIGS. 5 and 6, a description will be given below about the locking mechanism 1 in an assembled state including the base member 30 and the plate member 20.

A shaft hole 40h for insertion therethrough of the pivot shaft 25 is formed in an intermediate portion of a lever body 45 of the pivot lever 40. With the pivot shaft 25, the pivot lever 40 is secured pivotably to the plate member 20. In the pivot lever 40, one end portion of the lever body 45 inserted by the pivot shaft 25 extends to the right side of the plate member 20 and a grip 42 for operation is attached to the tip of the one end portion. The other end portion of the lever body 45 is disposed so as to overlap the stopper supporting slot 21 and the stopper member 41 inserted through the stopper supporting slot 21 is provided at the other end portion. The stopper member 41 extends through the stopper supporting slot 21 of the plate member 20 and is inserted into the guide slot 31 (or the locking recesses 31a and 31b) of the base member 30, as shown in FIG. 5. The locking direction associated with the movement of the stopper member 41 is substantially coincident with the pivoting direction of the pivot lever 40.

The stopper member 41 is formed in the shape of a hexagonal prism. More specifically, the width of the stopper member 41 is narrower toward the end on the side of the locking recesses 31a and 31b (i.e., on the rear side) and also toward the end on the side (i.e., on the front side) opposite to the locking recesses 31a and 31b, with respect to the guide slot 31, so as to correspond to the locking recesses 31a, 31b (see FIGS. 7A to 7D).

By operating the grip 42 of the pivot lever 40, the stopper member 41 is locked to the locking recess 31a or 31b or is moved along the guide slot 31, whereby the plate member 20 can be rotated to the right and left.

At the other end of the lever body 45 there is disposed a coil spring 43 which is a resilient member for urging the pivot lever 40. The coil spring 43 urges the pivot lever 40 so that the stopper member 41 is constantly urged in the direction (locking direction) in which the stopper member 41 is locked to the locking recess 31a or 31b. The shaft hole 40h is in the shape of an elongated hole and its longitudinal direction is substantially coincident with the guide directions along the guide slot 31. Therefore, the pivot lever 40 can be pivoted against the urging force of the coil spring 43. Further, when moving the stopper member 41 from the locking recess 31a or 31b into the guide slot 31, the pivot lever 40 can travel a distance corresponding to a gap in the shaft hole 40h. Further, by forming the shaft hole 40h as an elongated hole, it is possible to effect smooth switching between locking and release of the stopper member 41 at the time of moving the stopper member 41 between the guide slot 31 and the locking recesses 31a, 31b by operating the pivot lever 40.

Next, a description will be given about the operation of the rotation seat 110 according to this embodiment. First, it is assumed that the industrial vehicle is in the state of normal operation with the rotation seat 110 facing the front (the state of FIG. 2A). At this time, since the stopper member 41 is locked by the locking recess 31b (see FIG. 7A), the movement of the plate member 20 in its rotational direction is inhibited and the plate member 20 is in its locked state in which it cannot rotate with respect to the base member 30. Further, the resilient force of the coil spring 43 urges the stopper member 41 constantly in the direction in which the stopper member is locked to the locking recess 31b. Thus, in a state in which the pivot lever 40 is not operated, the stopper member 41 is kept locked to the locking recess 31a. At this time, the pivot lever 40 can travel a distance corresponding to the gap in the shaft hole 40h with respect to the pivot shaft 25. Moreover, since the stopper member 41 and the locking recess 31b are each in a wedge shape so as to be narrower toward the end on the side of the locking recess 31b, the stopper member 41 which has moved along the guide slot 31 is easy to get into the locking recess 31b.

Next, a description will be given about the operation for rotating the rotation seat 110 and changing the direction thereof. For example, when the industrial vehicle is to move backward, the rotation seat 110 is turned left so that the body of the driver faces right with respect to the front side (the state of FIG. 2B), whereby it becomes easier for the driver to see the rear side. First, the locked state of the stopper member 41 to the locking recess 31b is released. At this time, the pivot lever 40 is operated so that the stopper member 41 positioned in the locking recess 31b is moved toward the guide slot 31. In this embodiment the driver moves the grip 42 rearward. This operation is performed against the urging force of the coil spring 43. In operating the pivot lever 40 and when the stopper member 41 leaves the locking recess 31b, the stopper member 41 describes an arcuate path centered on the pivot shaft 25 because the pivot lever 40 is adapted to pivot about the pivot shaft 25.

Thereafter, when the rotation seat 110 is rotated so that the driver's body faces right in a state in which the stopper member 41 is positioned in the guide slot 31, the plate member 20 turns left (the plate member 20 turns right if the rotation seat 110 is rotated so that the driver's body faces left). Upon turning of the plate member 20 to the left (see FIG. 7B), the stopper member 41 reaches the locking recess 31a which is for a left turn position (see FIG. 7C). At this time, if the operating hand for the pivot lever 40 is slackened, the pivot lever 40 undergoes the urging force of the coil spring 43 and moves in the direction in which the stopper member 41 is locked to the locking recess 31a (see FIG. 7D). In this case, by moving the pivot lever 40 with respect to the pivot shaft 25 appropriately as necessary, the stopper member 41 becomes easier to be locked to the locking recess 31a.

Figure 6:
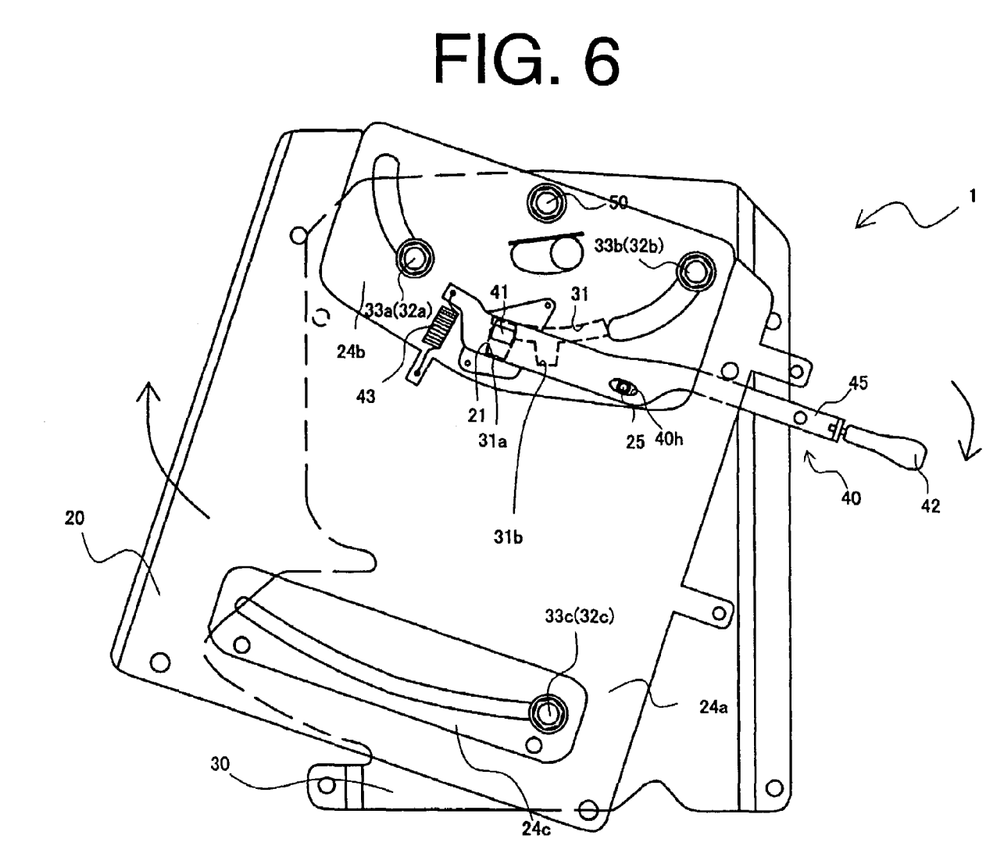
FIG. 6 is a top view showing a rotating state of the plate member in the locking mechanism for the rotation seat of FIG. 5.

Once the stopper member 41 is locked to the locking recess 31a, as shown in FIG. 6, the plate member 20 becomes a leftward rotated state with respect to the base member 30 and the stopper member 41 is locked to the locking recess 31a. As a result, the rotation seat 110 becomes an about 17° rotated state leftwards relative to the front direction. In this state, the driver sitting on the seat faces right with respect to the front side and the rotation seat 110 maintains its leftward rotated state unless the pivot lever 40 is again operated.

Figures 7A, 7B, 7C, 7D:
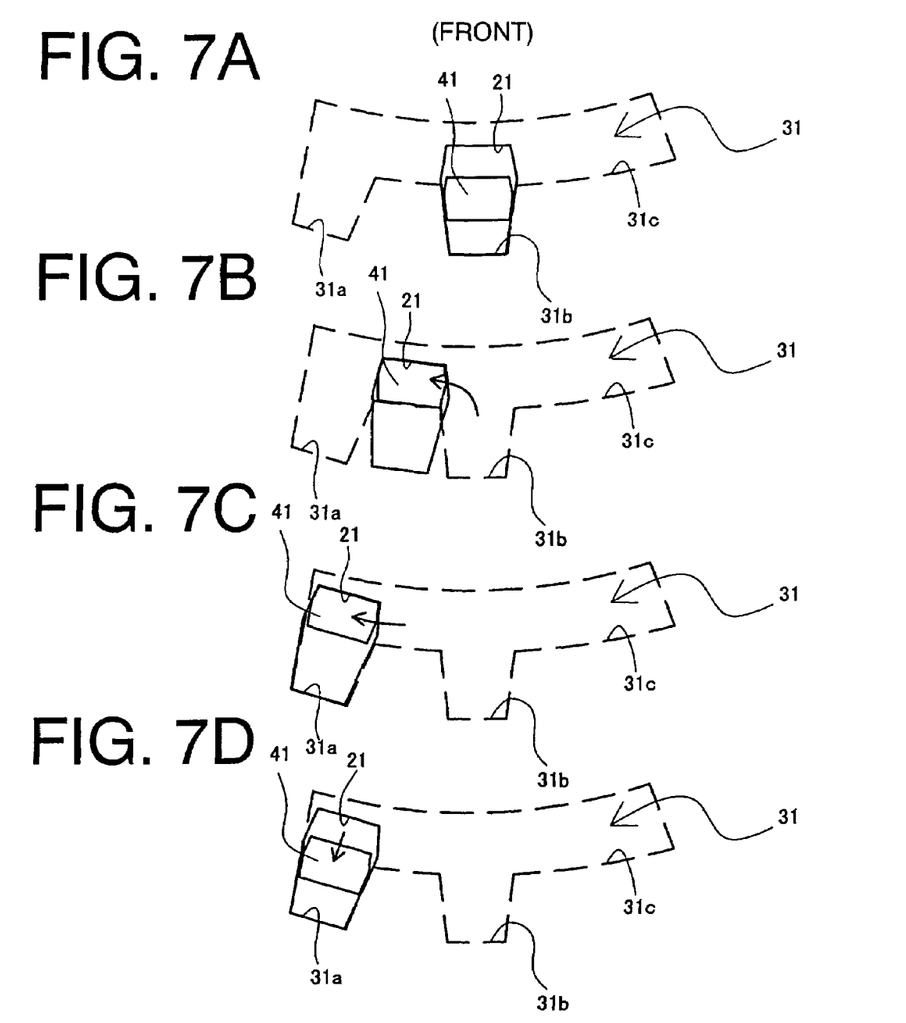
FIGS. 7A to 7D are explanatory diagrams showing normal operations of a stopper member to be locked.

When rotating the plate member 20 rightwards, the rotation seat 110 is not fixed in the rightwards rotated state of the plate member 20 because a locking recess is not formed in the portion of the guide slot 31 corresponding to the rightward rotation of the stopper member 41 (see the portion of 31c in FIG. 7). In this state the driver faces left with respect to the front side (the state of FIG. 2C). If the rotation seat 110 is turned right when the driver gets off the vehicle from the seat area 100, the driver's body faces the left side which is the getting-off side of the vehicle body. This is convenient for the driver to get off the vehicle.

The following description is now provided about the operation of the locking mechanism 1 in case of rotating the rotation seat 110 at high speed. First, reference is made to a comparative example shown in FIGS. 10A to 10C, in which a locking recess 931b has a tapered shape such that the width thereof becomes narrower with distance from a guide slot 931 and the width of a stopper member 941 also becomes narrower toward the end on the side of the locking recess 931b (i.e., on the rear side) with respect to the guide slot 931 so as to correspond to the width of the locking recess 931b. Here it is assumed that the rotation seat rotates leftwards and the stopper member 941 is locked to a locking recess 931a. Thereafter, the rotation seat is rotated rightwards in the figure at high speed so that the rotation seat faces the front side. In this case, the locking mechanism 1 operates in the following manner.

Figures 10A, 10B, 10C:
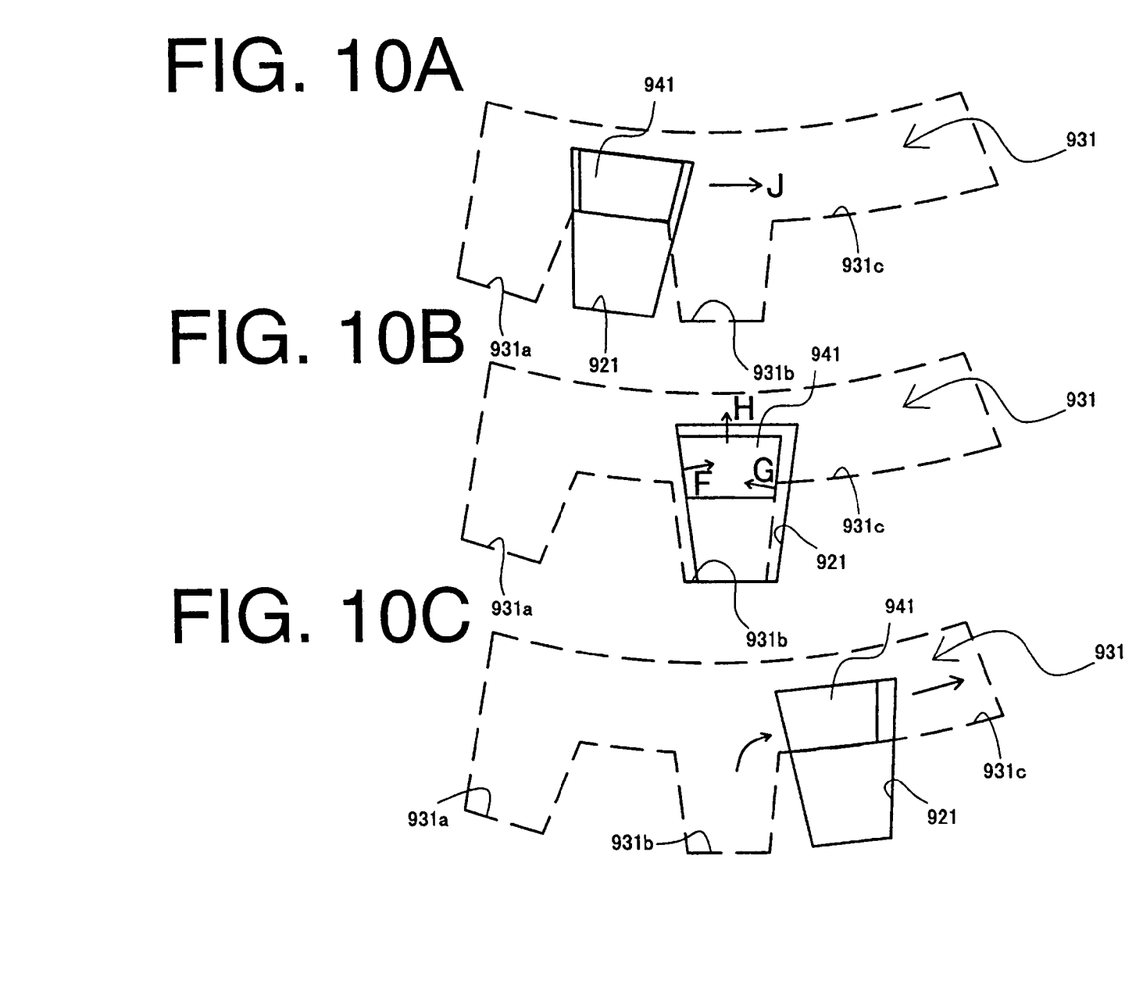
FIGS. 10A to 10C are explanatory diagrams showing operations of a stopper member when a rotation seat is rotated at high speed in a locking mechanism for a rotation seat as a comparative example.

First, the driver operates the pivot lever to rotate the rotation seat, whereby the stopper member 941 moves in the right guide direction in the figure (see FIG. 10A). The rotation of the rotation seat is continued without applying to the pivot lever any force that resists the urging force of the coil spring, and when the stopper member 941 arrives at the position of the locking recess 931b, the stopper member 941 gets into the locking recess 931b with the urging force of the coil spring (see FIG. 10B). However, since the rotating operation of the rotation seat is performed at high speed, even after entry of the stopper member 941 into the locking recess 931b, the force acting in the moving direction (guide direction) along the guide slot 931 still exists strongly by virtue of an inertia force of the rotation seat. At this time, in the contact portion of the stopper member 941 with the locking recess 931b and a supporting slot 921, the stopper member 941 undergoes forces acting in the directions of arrows G and F in the figure and eventually undergoes a force acting in the direction (direction of arrow H in the figure) opposite to the locking direction in which it leaves the locking recess 931b. If this force becomes larger than the urging force of the coil spring, the stopper member 941 returns to the guide slot 931 without being locked by the locking recess 931b. As a result, the stopper member 941 passes the locking recess 931b without being locked by the same recess, thus giving rise to the problem that the rotation seat cannot be locked at a predetermined position (see FIG. 10C).

However, such a problem can be solved by adopting the configuration of this embodiment. A more detailed description will now be given. It is assumed that the rotation seat 110 rotates leftwards and is locked to the locking recess 31a and is then rotated rightwards in the figure at high speed so that the rotation seat 110 faces the front side. First, the driver operates the pivot lever 40 to release the locked state and thereafter the rotation seat 110 is rotated so that the driver faces left, whereby the stopper member 41 moves in the right guide direction in the figure (see arrow J in FIG. 8A). After arrival of the stopper member 41 at the guide slot 31, such an operation as resists the urging force of the coil spring 43 is not performed for the pivot lever 40. Then, upon arrival at the position of the locking recess 31b, the stopper member 41 gets into the locking recess 31b with the urging force of the coil spring 43 (see FIG. 8B). The rotation of the rotation seat 110 is performed at high speed, so when the stopper member 41 gets into the locking recess 31b, the stopper member 41, in a contact portion 41b with the locking recess 31b, undergoes a large force acting in the direction opposite to the locking direction in which it leaves the locking recess 31b (in the direction in which the stopper member 41 is urged toward the guide slot 31 (in the direction of arrow C in the figure)). However, in an effort to cancel the above force, the stopper member 41 is pressed in the direction of being locked to the locking recess 31b (in the direction of arrow D in the figure) by means of the stopper supporting slot 21 of the plate member 20 which is in contact with the stopper member 41. The plate member 20 urges the stopper member 41 in the locking direction (in the direction in which the stopper member 41 is locked to the locking recess 31b) so that the contact portion 41b of the stopper member 41 and the locking recess 31b press each other while the plate member 20 and the stopper member 41 are in contact with each other. Consequently, the stopper member 41 is locked positively to the locking recess 31b without passing the locking recess 31b. As a result, when the rotation seat is rotated at high speed, the stopper member 41 is locked positively to the locking recess 31b. Further, the plate member 20 becomes a locked state in which it is unrotatable relative to the base member 30.

More particularly, the stopper supporting slot 21 is formed with a contact surface 21a (see FIG. 8A), and when the stopper member 41 moves in a guide direction along the guide slot 31 and gets into the locking recess 31b, the contact surface 21a of the stopper supporting slot 21 comes in contact with the stopper member 41. Further, the urging direction in which the contact surface 21a of the stopper supporting slot 21 presses the stopper member 41 makes an acute angle with the guide direction (the direction of arrow J in FIG. 8A) of the stopper member 41 and is directed toward the locking recesses 31a and 31b with respect to the guide slot 31 (the direction of arrow D in FIG. 8B). By such a simple configuration, the stopper member 41 is locked positively to the locking recess 31b even when the rotation seat is rotated at high speed.

It is the pressing force (i) of the stopper supporting slot 21 on the contact surface 21a and the urging force (ii) of the coil spring 43 that urge the stopper member 41 in the locking direction. On the other hand, it is the urging force (iii) in the contact portion 41b between the stopper member 41 and the locking recess 31b that urges the stopper member 41 in the direction opposite to the locking direction. On condition that the magnitude of a resultant force of the both forces (i) and (ii) is larger than the above force (iii), the stopper member 41 moves in the locking direction and is locked to the locking recess 31b even when the rotation seat is rotated at high speed.

Figures 8A, 8B:
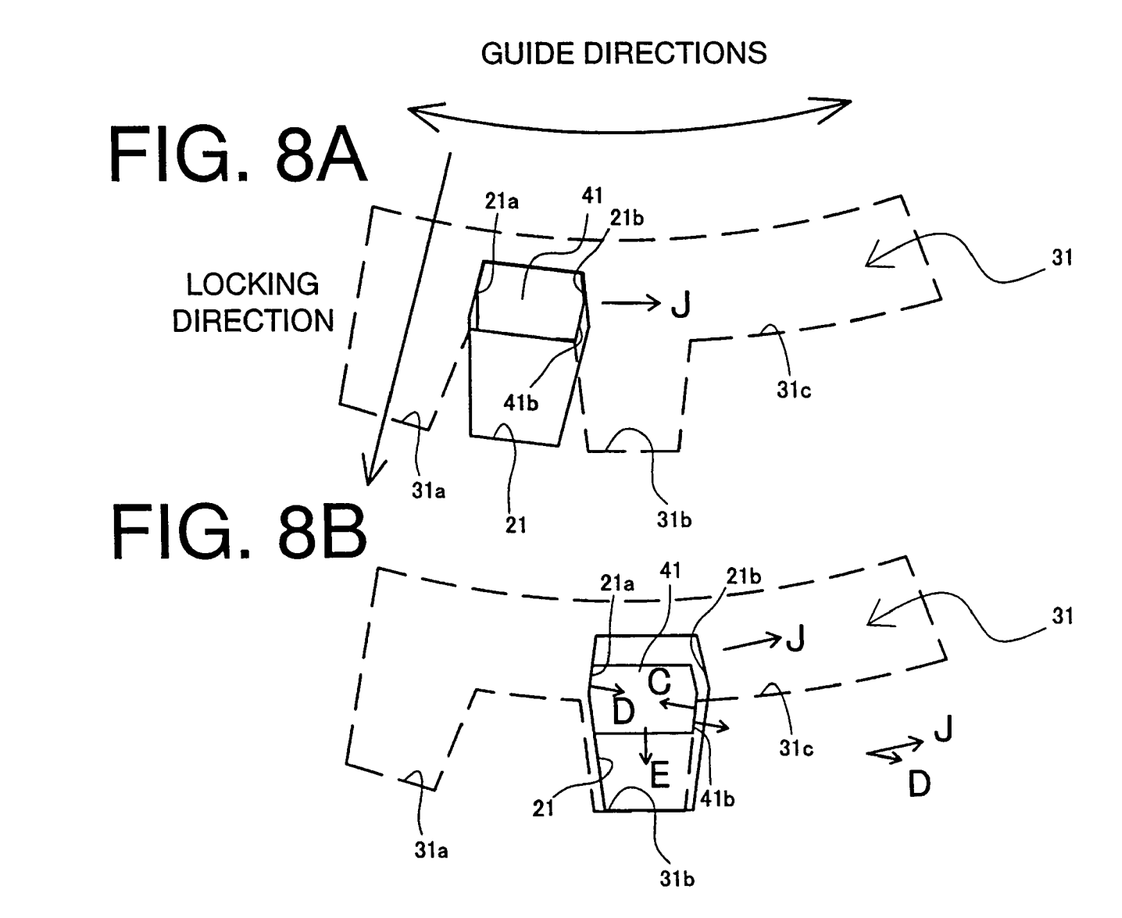
FIGS. 8A and 8B are explanatory diagrams showing operations of the stopper member to be locked when the rotation seat is rotated at high speed.

Although in the above embodiment a description has been given about the case where the stopper member 41 moves in the right guide direction, in order to be locked positively to the locking recess 31b even the case where the stopper member 41 moves from right turn position in the locking recess 31b (31c of FIG. 8A) in the left guide direction at high speed, not only the contact surface 21a but also a contact surface 21b is formed in the stopper supporting slot 21 on the side opposite to the contact surface 21a in the guide directions (see FIG. 8A). Thus, since the stopper supporting slot 21 is formed with the contact surfaces 21a and 21b for both guide directions along the guide slot 31, the stopper member 41 is locked positively to the locking recess 31b when moving in both guide directions along the guide slot 31 of the base member 30.

According to the above configuration, even when the rotation seat 110 is rotated at high speed, when the stopper member 41 gets into the locking recess 31b, the stopper member 41 undergoes, in the contact portion 41b with the locking recess 31b, a force acting in the direction (toward the front side) in which it leaves the locking recess 31b reverse to the locking direction, but in an effort to cancel the above force, the stopper member 41 is pressed in the direction of being locked to the locking recess 31 by the plate member 20 which is in contact with the stopper member 41, so that the stopper member is locked to the locking recess 31b without passing the same recess. As a result, there is obtained a locking mechanism 1 for a rotation seat wherein the stopper member 41 is locked positively to the locking recess 31b even when the rotation seat is rotated at high speed.

Moreover, the width of the stopper supporting slot 21 is narrower toward the end on the side of the locking recesses 31a, 31b with respect to the guide slot 31 and also toward the end on the side opposite to the locking recesses 31a, 31b. Likewise, the width of the stopper member 41 is narrower toward the end on the side of the locking recesses 31a, 31b with respect to the guide slot 31 and also toward the end on the side opposite to the locking recesses 31a, 31b. Thus, despite such a simple configuration, there is obtained a locking mechanism 1 for a rotation seat wherein the stopper member 41 is locked positively to the locking recess 31b when moving in both guide directions along the guide slot 31 of the base member 30 even in the case where the rotation seat is rotated at high speed. By forming the stopper member 41 in the shape of a hexagonal prism it is possible to effect the formation in a simple manner.

Further, the guide directions along the guide slot 31 are coincident with the circumferential directions associated with rotation of the plate member 20 through the rotary shaft 50 and the locking direction of the stopper member 41 to the locking recess 31b is coincident with the radial direction associated with rotation of the plate member 20 through the rotary shaft 50. Consequently, even in the case where the rotation seat is rotated at high speed, the stopper member 41 becomes easier to be locked to the locking recess 31b when moving in both guide directions along the guide slot 31 of the base member 30, thus affording a locking mechanism 1 for a rotation seat wherein the stopper member 41 is locked positively to the locking recess 31b.

Figure 9:
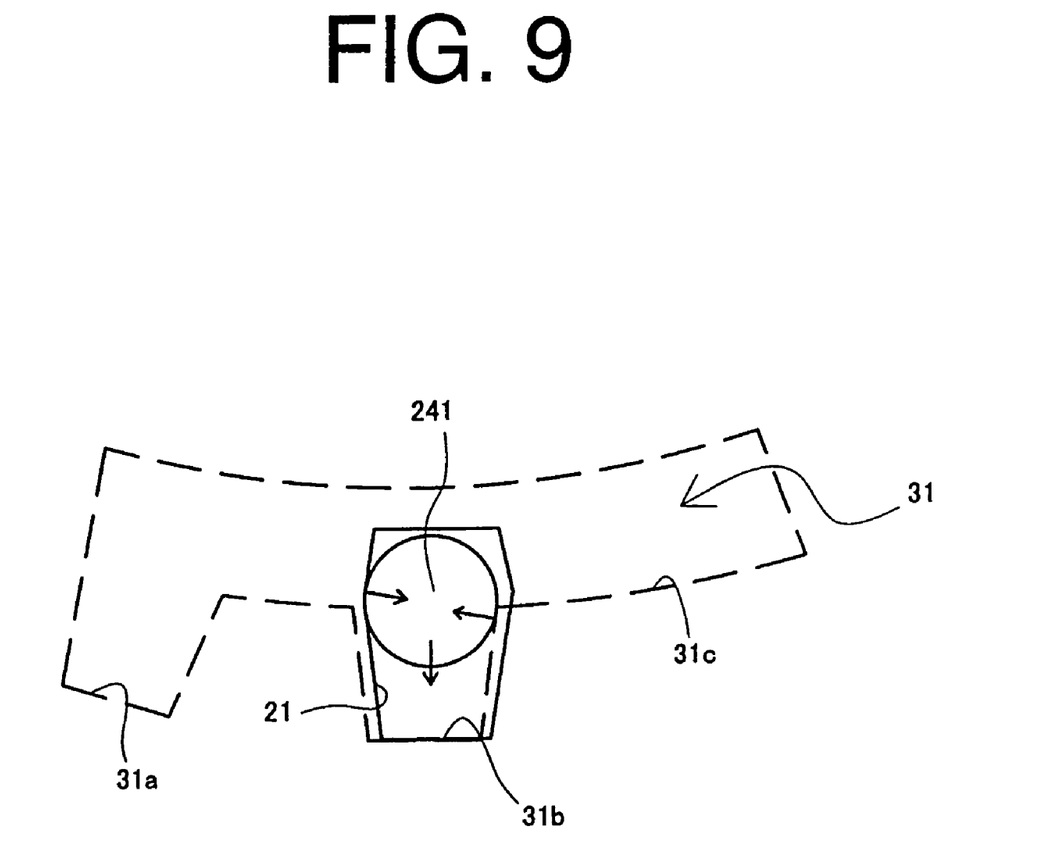
FIG. 9 is a schematic diagram showing a stopper member according to a modification of the embodiment of the present invention.

Next, with referenced to FIG. 9, a modification of the above embodiment will be described mainly about a portion different from the above embodiment. As to the same portions as in the above embodiment, they are identified by the same reference numerals as in the above embodiment, and explanations thereof will be omitted. A stopper member 241 according to this embodiment has such a cylindrical shape as shown in the figure. Even with such a shape, the stopper member 241 is pressed in a direction in which it is locked to the locking recess 31b, so that there is obtained the same effect as in the previous embodiment.

Although embodiments of the present invention have been described above, the present invention is not limited to the above embodiments, but various changes may be made insofar as they are described in the appended claims.

For example, although in the above embodiments two locking recesses are formed in the plate member, the number of locking recesses is not limited thereto. It may be larger.

The shape of the stopper member is not limited to such a hexagonal prism shape as in the above embodiments insofar as it is tapered back and forth. For example, it may be rhombic.

Therefore, the present examples and embodiments are to be considered as illustrative and not restrictive, and the invention is not to be limited to the details given herein but may be modified within the scope of the appended claims.

What is claimed is:

1. A locking mechanism for a rotation seat for use in an industrial vehicle, comprising:
    a plate member fixed to an underside of the rotation seat;
    a stopper member attached to the plate member;
    a base member fixed to a base of the industrial vehicle, the base member being formed with a guide slot for defining a rotatable range of the plate member;
    a rotary shaft for supporting the plate member rotatably with respect to the base member;
    a locking recess formed in an intermediate portion of the guide slot for locking the stopper member, the locking recess being formed continuously from the guide slot so that width thereof narrows with distance from the guide slot;
    and a resilient member provided in the plate member for urging the stopper member in a direction in which the stopper member is locked to the locking recess;
    wherein when the plate member rotates with respect to the base member, the stopper member is guided along the guide slot and is locked by the locking recess, whereby the plate member becomes locked so that the plate member is unrotatable relative to the base member,
    and wherein when the stopper member moves in at least one guide direction along the guide slot and gets into the locking recess, the stopper member is urged in the direction in which the stopper member is locked to the locking recess so that a contact portion of the stopper member and the locking recess press each other while the plate member and the stopper member are in contact with each other.

2. The locking mechanism according to claim 1, wherein the plate member is formed with a stopper supporting slot so that movement of the stopper member relative to the plate member is defined in the locking direction in which the stopper member is locked to the locking recess and also in the direction opposite thereto, wherein the stopper supporting slot is formed with a contact surface which comes in contact with the stopper member when the stopper member moves in one of the guide directions along the guide slot and gets into the locking recess, and wherein a direction in which the contact surface of the stopper supporting slot urges the stopper member makes an acute angle with the guide direction of the stopper member and is directed toward the locking recess with respect to the guide slot.

3. The locking mechanism according to claim 2, wherein the number of the contact surfaces is two, the two contact surfaces being formed for both guide directions along the guide slot.

4. The locking mechanism according to claim 2, wherein the stopper supporting slot is formed so that width thereof narrows toward an end on the side of the locking recess with respect to the guide slot and also toward an end on the side opposite to the locking recess with respect to the guide slot and wherein the stopper member is formed so that width thereof narrows toward an end on the side of the locking recess with respect to the guide slot and also toward an end on the side opposite to the locking recess.

5. The locking mechanism according to claim 1, wherein the stopper member is formed in the shape of a hexagonal prism.

6. The locking mechanism according to claim 1, wherein the guide directions along the guide slot are coincident with circumferential directions associated with the rotation of the plate member through the rotary shaft and wherein the locking direction of the stopper member to the locking recess is coincident with a radial direction associated with the rotation of the plate member through the rotary shaft.

7. The locking mechanism according to claim 1, wherein the number of the locking recesses is two.

8. The locking mechanism according to claim 1, wherein the resilient member is a coil spring.

\* \* \* \* \*